United States Patent [19]

McGrain

[11] 4,164,347
[45] Aug. 14, 1979

[54] SEPARATOR MEMBER DRIVE MECHANISM

[75] Inventor: Thomas M. McGrain, Rochester, N.Y.

[73] Assignee: Eastman Kodak Company, Rochester, N.Y.

[21] Appl. No.: 880,400

[22] Filed: Feb. 23, 1978

[51] Int. Cl.² ............................................. B65H 5/22
[52] U.S. Cl. .................................................. 271/3.1
[58] Field of Search ...................... 271/3.1, 145, 265

[56] References Cited

U.S. PATENT DOCUMENTS

| 3,556,512 | 1/1971 | Fackler | 271/4 |
| 4,078,787 | 3/1978 | Burlew | 271/3.1 |

Primary Examiner—Richard A. Schacher
Attorney, Agent, or Firm—Lawrence P. Kessler

[57] ABSTRACT

A drive mechanism is provided for the separator member of a recirculating document feeder. The separator member distinguishes pages of a document yet to be fed to a copier from those already fed to the copier by the recirculating document feeder and returned to the document stack during the document copying cycle. The drive mechanism includes a rotatable member mounted for coaxial rotation with the rotatably mounted separator member. A plurality of pawls on the rotatable member are mounted for movement between a first position in which the pawls are disposed to drivingly engage the separator member to rotate the separator member and a second position in which the pawls are disengaged from the separator member. When the rotatable member is driven, one of the pawls is moved to its first and second position in timed relation to the feeding of the last page of a document to be copied from and to the document stack respectively.

8 Claims, 3 Drawing Figures

SEPARATOR MEMBER DRIVE MECHANISM

CROSS REFERENCE TO RELATED APPLICATION

Reference is made to commonly, assigned copending U.S. Patent Application Ser. No. 647,683, filed Jan. 8, 1976, which is a continuation of Application Ser. No. 523,610, filed on Nov. 13, 1974 in the name of Matthew J. Russel and entitled RECIRCULATING SHEET FEEDER.

BACKGROUND OF THE INVENTION

1. Field of the Invention

This invention relates generally to document feeders, and more particularly to a drive mechanism for the separator member of a recirculating document feeder.

2. Description of the Prior Art

In order to improve the productivity of an electrophotographic copier/duplicator making multiple copy sets of multi-page documents, apparatus has been described in Belgian Pat. No. 835,568 (issued May 13, 1976) for circulating discrete pages of the document so that each of the copy sets of the document are made in page sequential order. Because the document pages are continuously circulated until the desired number of copy sets are made, this apparatus is called a recirculating document feeder. The document copying cycle is as follows: With the document placed face up in a supply hopper of the recirculating document feeder, successive pages of the document are removed from the bottom of the stack in the hopper and fed seriatim, information side down, to the platen of the electrophotographic copier. Each page in turn, is stopped on the platen and exposed by an illumination source and a copy of that page is made by the copier. After each page is exposed, it is fed back to the hopper and deposited on top of document pages remaining in the hopper. Recirculation of the discrete pages continues until the desired number of complete copy sets of the document have been made.

A separator member is positioned to rest on the top surface of the first numerical page of the multi-page document (the top sheet of the document when first placed face up in the supply hopper). The separator member has an elongated arm mounted for rotation about an axis adjacent and substantially parallel to the supply hopper. As successive pages of the document are delivered to the platen and returned to the hopper, they overlie the separator member. The separator member thus distinguishes the pages of the document yet to be fed to the copier from the pages already fed to the copier while a complete copy of the document is being made. When the first numerical page (last page in the sequence to be copied) is fed from the hopper, the separator member falls under the influence of gravity through an opening in the floor of the hopper and actuates a counter to indicate that each page of the document has been fed once to the copier platen.

After the separator member actuates the counter and while the first numerical page is being returned to the supply hopper, the member is engaged by a drive mechanism and is rotatably driven toward a position overlying the first numerical document page. The timing of the drive mechanism and the feeding of the page are interrelated such that the page is deposited in the hopper prior to the member reaching its overlying position. The separator member is disengaged from the drive mechanism before reengaging the first numerical page. This disengagement action is desireable to reduce the force on impact of the member with the page to prevent damage to the page. Further, disengagement of the separator member from the drive mechanism enables the member to follow the level of first numerical page as its height in the stack changes during the document copying cycle.

Due to the speed with which the pages are circulated, the interval of the time between the feed of the first numerical page from the hopper and the return of the hopper of the next subsequently fed page is relatively short. Therefore the timing of actuation of the drive mechanism is critical to insure that the separator member is returned to its position to overlie the first numerical page before the next subsequently fed page is deposited in the hopper. Since most drive mechanisms display some variability in actuation time, their ability to repeatably function within this time interval may be less than satisfactory for use in a high speed recirculating document feeder. If the separator member is not returned within the particular time interval, it may cause jamming in the feeder. Moreover, even if jamming does not occur, subsequent document copies would contain duplicates of certain pages.

SUMMARY OF THE INVENTION

In accordance with the present invention a drive mechanism is provided for the separator member of a recirculating document feeder. The drive mechanism rapidly engages and disengages the separator member and repeatably functions to drive the separator member during the short time interval necessary for properly timed operation with respect to the document copying cycle of the recirculating document feeder. That is to say, the drive mechanism reliably returns the separator member to reengage the last page of a document to be copied after that page has been fed to the platen and returned to the document stack and before the next subsequently fed page is returned to the document stack.

The drive mechanism includes a rotatable member mounted for coaxial rotation with the rotatably mounted separator member. Rotation of the rotatable member is initiated in timed relation to the feeding of the last page from the document stack to the platen and terminated in timed relation to the feeding of the last page from the platen to the document stack. A plurality of pawls on the rotatable member are mounted for movement between a first position in which the pawls are disposed to drivingly engage the separator member and a second position in which the pawls are disengaged from the separator member. One of the pawls is moved to the first position to rotate the separator member upon rotation of the rotatable member and to the second position to disengage the separator member upon the termination of rotation of the rotatable member.

More particularly, the plurality of pawls are spaced equidistantly about the rotatable member. Thus the one pawl moved to its first and second position is the pawl located, in the direction of travel of the pawls, most closely adjacent to the separator member after the separator member is released by the last page of the document. Therefore, rapid initiation of the drive is effected to insure return of the separator member within the time interval for properly timed operation relative to the document copying cycle.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
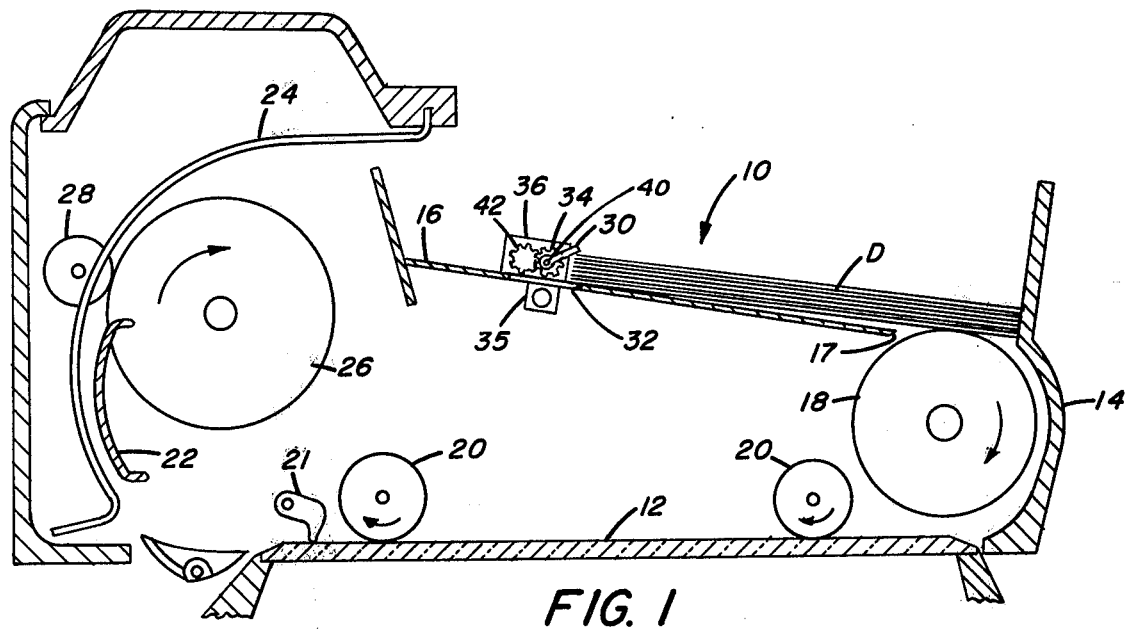
FIG. 1 is a generally schematic side elevational view, in section of a recirculating document feeder incorporating a separator member drive mechanism according to this invention.

Referring to the drawings, FIG. 1 shows, in somewhat simplified form, the recirculating document feeder 10 of the aforementioned Belgian Pat. No. 835,568. The recirculating document feeder of that patent and its operation are described herein only to the extent necessary for a complete understanding of the instant invention. It is of course understood that while the drive mechanism is described in its relation to the recirculating document feeder of the Belgian patent it could also be incorporated in any other document feeder which recirculates document pages and utilizes a separator member to distinguish pages yet to be copied from those already copied and returned to the document stack.

The feeder 10, which is mounted to overlie a glass platen 12 of a document copier (not shown), includes a frame 14 within which a document hopper 16 is mounted. When it is desired to make one or more sets of copies of a multi-page document D bearing information on one side of each page, the document is stacked on the support, or floor, of the hopper 16 in page sequential order, information side up, first numerical page on top. A sheet separator member 30 is positioned to engage the first numerical (top) page of the document D. The member 30 is mounted for free rotation about the axis of a shaft 40. The shaft 40 is positioned adjacent and substantially parallel to the floor of the hopper 16 so that the member 30 can follow the level of the first numerical page of the document as its height in the stack changes during the document copying cycle.

A feed mechanism 18 (such as an oscillating vacuum feeder) is located adjacent to an opening 17 in the forward end of the hopper 16. When the document copying cycle is initiated, the feed mechanism 18 removes the bottom page of the document from the hopper and transports the page, information side down, to the platen 12. Rotating drive rollers 20 overlying the platen frictionally engage the page to position the page on the platen against a registration gate 21. When the page is registered against the gate, it is reproduced on a copy receiving sheet. In an electrophotographic copier, a latent electrostatic image is formed on a charged photoconductive member. The electrostatic image is then processed to obtain a copy of that page on the copy receiving sheet. Of course different reproduction processes are employed in other types of copiers such as, for example, microfilmers or facsimile apparatus.

Once the requisite copy is formed, the registration gate 21 pivots out of the sheet path and rollers 20 frictionally drive the page from the platen into a return path formed by guides 22 and 24 fixed to the frame 14. In the return path, a drive roller 26, cooperating with a nip roller 28, transports the page along the return path back into the hopper 16 where it is deposited on top of the separator member 30 and the other pages of the document D. The separator member 30 thus serves to distinguish the pages of the document yet to be fed to the copier platen from those pages already fed to the platen and returned to the hopper. The described cycle is repeated for each succeeding page of the document D with recirculation being at a rate compatible with the most efficient copy rate of the copier.

By mounting the separator member 30 for free rotation about the axis of shaft 40 of this exemplary recirculating document feeder, the member follows the level of the first numerical page as its height in the stack changes until that page is fed from the hopper 16. As the first numerical page is fed to the platen 12, the separator member 30 is released and falls under the influence of gravitational forces through an opening 32 in the floor of the hopper 16. When the member 30 passes through the opening 32, it actuates a switch 35 to energize a motor 36 and simultaneously trips a counter (not shown) to indicate that all the pages of the document D have been fed to the copier platen 12. A drive mechanism 34, driven by motor 36, engages the separator member 30 to rotate the member to the position overlying the first numerical page. The timing of the rotation of the separator member 30 and the feeding of the first numerical page from the platen are interrelated such that the page is deposited in the hopper 16 prior to the member reaching the overlying position. The described cycle is repeated until the desired number of complete copy sets of the document D are produced.

Figure 2:
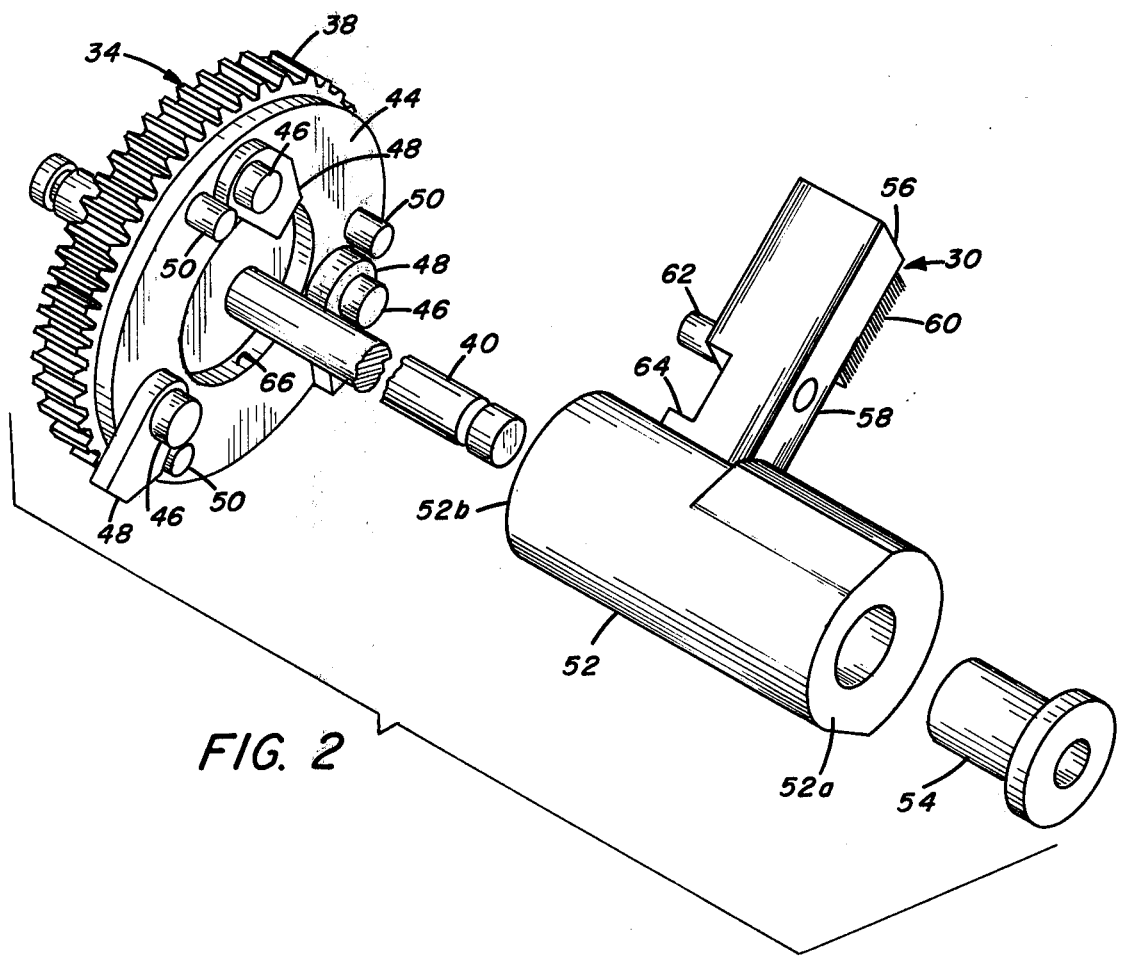
FIG. 2 is an exploded view in perspective of the separator member and the drive mechanism of FIG. 1 on an enlarged scale.

Since the pages are circulated at a high rate of speed, the time interval for return of the separator member 30 before any page fed from the hopper subsequent to the feeding of the first numerical page is returned to the hopper is relatively short. Furthermore, as previously discussed, it is desireable for the drive mechanism to operatively engage the separator member 30 for only a portion of the full rotational cycle of the member to prevent damage to the pages caused by the member being driven into contact with the pages and to enable the member to follow the level of the first numerical page. Therefore, to insure repeatable actuation of the member 30 within the desired time interval and subsequent disengagement of the member by the drive mechanism 34, the drive mechanism according to this invention is provided as particularly shown in FIGS. 2 and 3.

The drive mechanism 34 comprises a gear 38 mounted on the shaft 40. The gear 38 is driven by an output gear 42 of the motor 36. When the motor is energized, the gear 42 rotates the gear 38 in a clockwise direction (FIG. 1). A plate 44 integral with a peripheral face of the gear 38 carries a series of posts 46 oriented parallel to the shaft 40. The posts 46 are equally spaced about the face of the plate 44, as for example 120° apart. Each post 46 supports a pawl 48 for pivotable movement about its respective post. Stop pins mounted on the plate 40 are associated with each pawl 48 to limit the counterclockwise movement of the respective pawl. Thus as the gear 38 and plate 44 rotate, the pawls travel in a path in which they rotate counterclockwise (FIG. 3) about their respective posts under the influence of gravitational forces to a radially extended position (e.g., left most pawl of FIG. 3) and then clockwise to a retracted position (e.g., top right most pawl of FIG. 3).

The separator member 30 includes a sleeve 52 having a bearing 54 inserted in one end (52a). A separator arm 56 integral with the sleeve 52 extends radially outwardly from the sleeve. The face 58 of the arm 56 which engages the first numerical document page is covered, at least in part, with a plush material 60 to cushion impact of the arm with the page to prevent damage to the page. A pin 62 mounted in the arm 56 extends outwardly from the arm. The pin is oriented parallel to the axis of the sleeve 52 and extends in the direction of the end (52b) of the sleeve facing the plate 44. A recess 64 of a size substantially larger than the head of the post 46 is formed in the arm 56 between the pin 62 and the sleeve 52.

Upon assembly, the end 52b of the sleeve 52 is positioned in a recess 66 in the plate 44 to abut the gear 38 to spatially locate the arm 56 relative to the plate. The shaft 40 extends through the sleeve 52 into the bearing 54 to concentrically locate the sleeve on the shaft. With the sleeve 52 so positioned, the arm 56 is located a distance from the plate 44 such that the pin 62 intercepts the pawls when the pawls are in their radially extended position. Further, the location of the arm 56 relative to the plate 44 enables the posts 46 to pass freely through the recess 64, e.g., when the arm is released by the first numerical page as the page is fed from the hopper 16.

Figure 3:
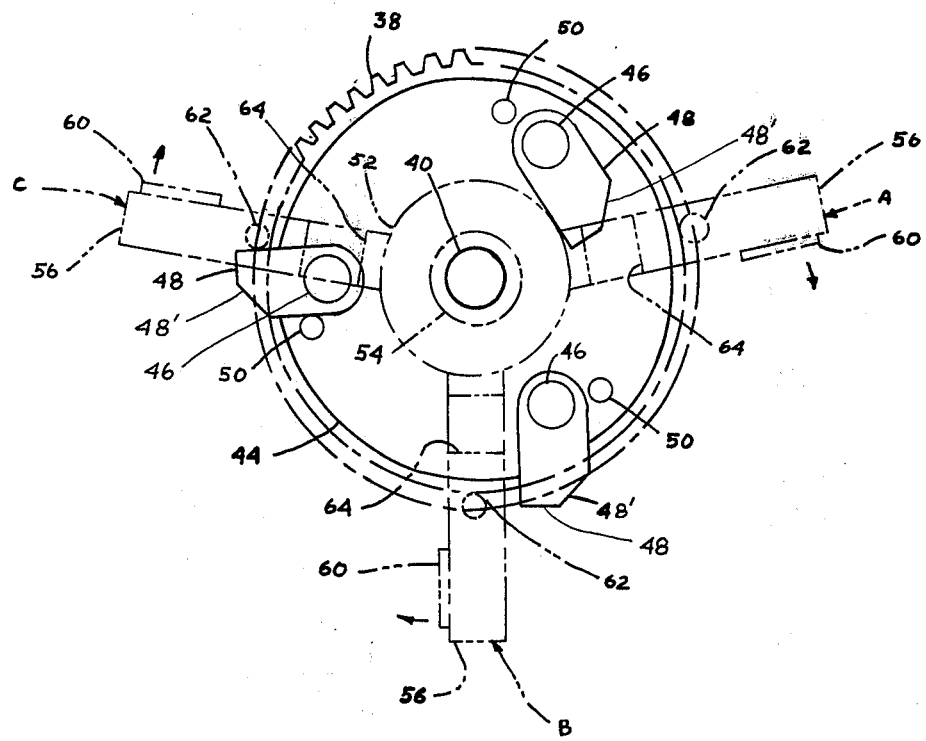
FIG. 3 is a side elevational view of the drive mechanism of this invention showing the relationship of the drive mechanism and the separator member, in phantom, at three different angular positions.

The operation of the drive mechanism 34 can best be illustrated with reference to FIGS. 1 and 3. With the arm 56 of the separator member 30 in engagement with the first numerical page of the document D (position A of FIG. 3), the pages are circulated seriatim by the feed mechanism 18 of the feeder 10 to the platen 12 so that a complete copy of the document can be made by the copier. The arm 56 follows the level of first page as its height changes in the document stack. When the first numerical page (the last page of the document to be copied) is fed from the hopper 16, the arm 56 is released by the page and the member 30 rotates about the shaft 40 under the influence of gravitational forces through the opening 32, towards its bottom position (position B of FIG. 3). If one of the pawls 48 is located so as to extend into the path of travel of the pin 62 of the member 30 (e.g., lower right pawl of FIG. 3), the pin 62 will engage the cam surface 48' of the pawl and pivot the pawl clockwise about its post 46 out of the travel path so that the member 30 can assume its bottom position. At this bottom position the arm 56 actuates the switch 35 by any appropriate means depending upon the type of switch employed (e.g., physical contact, magnetic reed, etc.). Actuation of the switch trips the set counter (not shown) to indicate that all the pages of the document have been circulated to the copier platen and simultaneously energizes the motor 36 to rotate the gear 42 and thus gear 38.

At the instant in time the motor 36 is energized, the pawl 48 closest in direction of travel to the separator member 30 will be substantially in its radially extended position due to the influence of gravitational forces. The respective pin 50 limits counterclockwise rotation of the pawl about its post 46 and, in effect, locks the pawl 48 in its extended position. As the gear 38 rotates, the extended pawl engages the pin 62 of the arm 56 to rotate the member 30 about the shaft 40 (as indicated in position C of FIG. 3). The gear 38 is rotated through an angle of between 240°–270° to move the arm 56 past the vertical at which time the motor 36 is deenergized. Deenergization may be initiated by sensing the degree of angular rotation of the gear 38 or the passing of the vertical by the arm 56. Upon deenergization of the motor 36, the gear 38 stops and the member 30 is released from driving action of the pawl but continues to rotate about the shaft 40 due to gravitational and inertial forces. As the pin 62 of the arm 56 moves away from the pawl 48, the pawl pivots about its post 46 in a clockwise direction to its retracted position due to gravitational forces. The pawl is thus positioned so that upon further movement in its travel path it is not intercepted by the pin 62.

As the arm 56 of the member 30 is rotated from its position B to its position A, the first numerical page is transported from the platen 12 back to the hopper 16. The timing of the movement of the member 30 is interrelated with transport velocity of the first numerical page such that the arm 56 returns to position A after the page is deposited in the hopper and before the next subsequently fed page is returned thereto. Due to the face that the member 30 is released from the driving action of the pawl before the arm 56 reengages the pages of the document D, the arm 56 returns to its position to overlie the first numerical page without being under the influence of a positive driving force which might cause damage to the page.

By providing the plurality of pawls 48, the beginning angular position of the gear 38 is not of critical importance in driving the member 30 between position B and position A within the desired time interval (the desired time interval being established by the transport of the first numerical page to return the page to the hopper and the return to the hopper of the next subsequently fed page). That is to say, irrespective of the angular position of the gear 38, when the motor 36 is energized, one pawl in its extended position is always located close enough to the pin 62 of the arm 56 to engage the pin and return the arm to its position A (in engagement with the first numerical page of the document) within the desired time interval.

From the foregoing it is apparent that this invention provides a drive mechanism for a separator member of a recirculating document feeder. The drive mechanism includes a rotatable member mounted for coaxial rotation with the rotatably mounted separator member. A plurality of pawls are pivotably mounted on the rotatable member for movement, under the influence of gravitational forces, between a radially extended position disposed to drivingly engage the separator member and a retracted position out of engagement with the separator member. The rotatable member and the separator member are positionally related such that when the separator member is released by the last page of the document being fed to the copier platen to make a complete copy of the document, the separator member is moved to a position where it is disposed to be engaged by a radially extended pawl. Rotation of the rotatable member is initiated in timed relation to the feeding of the last page from the document support to the platen and terminated in timed relation to the feeding of the last page from the platen to the document support. One of the pawls is moved to the first position to rotate the separator member in response to initiation of rotation of the rotatable member and the second position to disengage the separator member in response to the termination of rotation of the rotatable member. The drive mechanism is thus capable of repeatably operating to positively return the separator member to its distinguishing position and release the separator member during the time interval between the feeding of the last page of the document to be copied and the return to the document stack of the next subsequently fed page.

The invention has been described in detail with particular reference to preferred embodiment thereof, but it will be understood that variations and modifications can be effected within the spirit and scope of the invention.

I claim:

1. In an apparatus for circulating discrete pages of a document from a document support to the platen of a copier for copying and then back to said document support, said apparatus having a rotatably mounted separator member engageable with the last page to be copied for distinguishing pages yet to be copied during a document copying cycle from those returned to said document support after copying, means for drivingly engaging said separator member, after said last page has been fed from said document support, to move said separator member toward a position overlying said last page upon return of said last page to said document support and then terminating engagement with said separator member, said means comprising:
- a rotatable member mounted for coaxial rotation with said separator member;
- means for initiating rotation of said rotatable member in timed relation to the feeding of said last page from said document support to the platen and terminating rotation of said rotatable member in timed relation to the feeding of said last page from the platen to said document support; and
- a plurality of pawls on said rotatable member mounted for movement between a first position in which the pawls are disposed to drivingly engage said separator member and a second position in which the pawls are disengaged from said separator member, one of said pawls being movable to said first position to rotate said separator member upon rotation of said rotatable member and to said second position to disengage said separator member upon the termination of rotation of said rotatable member.

2. The invention of claim 1 wherein said pawls are spaced equidistantly about said rotatable member.

3. The invention of claim 1 wherein said rotatable member includes: a shaft positionally supported adjacent and substantially parallel to said document support, a plate mounted on said shaft, a plurality of posts equidistantly spaced about said plate for supporting said plurality of pawls respectively for free rotation, and stop means associated with said posts for establishing said first position of said pawls.

4. The invention of claim 3 wherein said posts are oriented parallel to said shaft whereby movement of said pawls between said first and second positions is induced by gravitational and inertial forces.

5. In an apparatus for circulating discrete pages of a document from a document support to the platen of an electrophotographic copier for copying and then back to said document support, said apparatus having a member engageable with the last page of said document for distinguishing pages yet to be copied during a document copying cycle from those returned to said document support after copying, means for drivingly engaging said member, after the last page has been fed from said document support, to move said member in a path toward engagement with said last page after said last page has been returned to said document support and for terminating engagement with said member prior to reengagement of the member with said last page, said means comprising:
- a shaft supported adjacent and substantially parallel to said document support, said member being mounted on said shaft for free rotation about the longitudinal axis of said shaft;
- a gear mounted on said shaft in spaced relation to said member;
- means for initiating rotation of said gear in timed relation to the feeding of said last page from said document support to said platen and terminating rotation of said gear in timed relation to the feeding of said last page from said platen to said document support; and
- a plurality of pawls independently mounted on one face of said gear for free pivotable movement about respective axes which are parallel to the axis of said shaft, under the influence of gravitational forces, between a radially extended position in the path of movement of said member and a retracted position remote from said path of movement whereby when said last page has been fed from said document support and gear rotation is initiated, said member is engaged by one of said radially extended pawls to be driven thereby toward its position to overlie said last page, and after said last page has been returned to said document support, rotation of said gear is terminated and said one pawl is retracted by gravitational and inertial forces out of driving engagement with said member.

6. The invention of claim 5 wherein said drive means further includes a plurality of posts longitudinally centered on said axes of said plurality of pawls respectively and mounted on said one face of said gear for pivotably supporting said pawls, and a plurality of pins carried on said one face of said gear, said plurality of pins being associated with said plurality of pawls respectively to restrain said pawls from moving beyond said radially extended position.

7. The invention of claim 6 wherein said posts are equidistantly spaced about said face of said gear.

8. The invention of claim 5 wherein said member comprises a sleeve coaxially mounted on said shaft for free rotation about said shaft, an arm extending from said sleeve for engagement with said last document page, and means on said arm disposed to be engaged by one of said pawls in a radially extended position for transmitting rotation of said gear to said member.

* * * * *